(12) United States Patent
Garcia

(10) Patent No.: US 7,108,309 B2
(45) Date of Patent: Sep. 19, 2006

(54) SUN VISOR WITH CONDUCTING ARM FOR VEHICLES

(75) Inventor: Rafael Garcia Garcia, Burgos (ES)

(73) Assignee: Grupo Antolin-Ingenieria, S.A., (ES)

( * ) Notice: Subject to any disclaimer, the term of this patent is extended or adjusted under 35 U.S.C. 154(b) by 0 days.

(21) Appl. No.: 10/482,986

(22) PCT Filed: May 7, 2002

(86) PCT No.: PCT/ES02/00213

§ 371 (c)(1),
(2), (4) Date: Sep. 14, 2004

(87) PCT Pub. No.: WO03/095253

PCT Pub. Date: Nov. 20, 2003

(65) Prior Publication Data

US 2005/0104409 A1    May 19, 2005

(51) Int. Cl.
*B60J 3/00* (2006.01)
(52) U.S. Cl. .................................... 296/97.9
(58) Field of Classification Search ............... 296/97.1, 296/97.5, 97.9, 97.12, 97.13
See application file for complete search history.

(56) References Cited

U.S. PATENT DOCUMENTS

| | | | | |
|---|---|---|---|---|
| 4,363,511 A | * | 12/1982 | Viertel et al. | 296/97.5 |
| 4,791,537 A | * | 12/1988 | Fisher et al. | 362/135 |
| 4,879,637 A | * | 11/1989 | Clark et al. | 362/141 |
| 5,320,399 A | * | 6/1994 | White et al. | 296/97.12 |
| 5,486,033 A | * | 1/1996 | Lecorvaisier et al. | 296/97.13 |
| 5,727,837 A | * | 3/1998 | Viertel | 296/97.1 |
| 5,902,002 A | * | 5/1999 | Wilson | 296/97.13 |
| 6,135,610 A | * | 10/2000 | Beck et al. | 362/142 |
| 6,139,083 A | | 10/2000 | Fischer et al. | |
| 6,319,014 B1 | | 11/2001 | Gunay et al. | |
| 6,428,193 B1 | * | 8/2002 | Guyot | 362/492 |
| 6,676,129 B1 | * | 1/2004 | Wilson | 296/97.9 |

FOREIGN PATENT DOCUMENTS

| | | |
|---|---|---|
| DE | 1 960 8 566 | 12/1997 |
| DE | 1 002 5 743 | 12/2001 |
| EP | 0 399 368 | 11/1990 |
| EP | 0 844 122 | 5/1998 |
| EP | 1 010 556 | 6/2000 |

OTHER PUBLICATIONS

International Search Report for PCT/ES02/00213 (Jul. 1992).

\* cited by examiner

*Primary Examiner*—H Gutman
(74) *Attorney, Agent, or Firm*—Ostrolenk, Faber, Gerb & Soffen, LLP

(57) ABSTRACT

The sun visor comprises a plate (1) for fastening to the bodywork of the vehicle and an arm (2) mounted in a hinged manner on the base (1), which in turn constitutes the means of assembly for the eyeshade of the sun visor. The arm (2) has a pair of conductive metallic elements (9) and (9'), located approximately parallel to each other and coated by means of an over-injected material, leaving the end (10) of such metallic elements (9–9') uncovered to be able to establish contact with strips (7) foreseen in the hole (5) wherein the arm (2) is mounted in a hinged manner, whilst the other end of such elements (9–9') in one case appears on the exterior in a terminal length (11) and in another of shorter length and defines a terminal end (12) which is uncovered on the arm (2), to be able to establish connection with a contact established on the actual eyeshade of the sun visor, for the enabling or disabling of the electrical device which can interact with said sun visor.

7 Claims, 7 Drawing Sheets

SUN VISOR WITH CONDUCTING ARM FOR VEHICLES

OBJECT OF THE INVENTION

The present invention relates to a sun visor for vehicles which, being constituted by the articulation of an arm on which is mounted the corresponding eyeshade and a supporting base secured to the bodywork of the vehicle, has the particularity that the arm is fitted with conductive metallic rigid elements constituting individual inserts inside an encircling insulating and non-conductive material, so that those elements have their ends shaped in a special way so that thereon contact can be established or not by some electrical power supply terminals proceeding from the vehicle itself, so that in accordance with the position of the arm with respect to the supporting base or of the eyeshade with respect to the arm itself, it will be possible to establish the connection and disconnection and therefore the actuation or not of an electrical device which can be mounted on the actual eyeshade of the sun visor or in another part of the vehicle.

The assembly falls within the field of the sun visors with electrical device, being compatible with any one of the systems habitually employed for its assembly and fastening, as well as being compatible with any known sun visor technology of those which incorporate some type of electrical device.

BACKGROUND OF THE INVENTION

At the present time different systems are known of defining a hinged sun visor assembly with electrical device, systems which comprise different elements to fulfil all the functions which are required of the corresponding pieces.

As is known, in a sun visor two fundamental parts or bodies intervene, one corresponding to the base for fastening to the bodywork of the vehicle and the other corresponding to a mobile subassembly formed by a supporting arm which is mounted in a hinged manner on the aforesaid base, and an eyeshade which in turn is also mounted in a hinged manner on said supporting arm.

In the sun visors with electrical device, the mobile arm has a metallic, usually hollow core, to provide rigidity and a plastic coating for aesthetic purposes and for reducing friction, so that the electrical connection between the vehicle and the sun visor is implemented by means of cables and conductors which are hidden inside the actual mobile arm. In some advanced models the conductors are over-injected constituting part of the actual mobile arm.

On the other hand, the electrical connection is implemented by means of electrical connectors, it being necessary to define a male-female unit for the connection between vehicle and sun visor. The mechanical union of the sun visor with the vehicle is implemented through the base of the hinged system.

The different switching devices are implemented by means of mechanisms based on conductive boards with various designs, but in all cases having a common denominator which consists in that it only has a switch function.

The functions of rigidity, electrical connection, switch and hinge, in the known models of sun visors, are provided by different pieces and of different nature, requiring multiple assembly operations during the production of the sun visor, with what this implies in time, cost, risk of poor quality and lack of reliability in use, as well as that the automation of the fabrication process of the end product is made more difficult, increasing the cost of the sun visor.

In a word, the current sun visors with electrical device have a series of restrictions and drawbacks which can be summarized as follows:

Lack of reliability and substantial complexity of the electrical connection between the bodywork or the panel of the vehicle roof and the actual sun visor.

The current means implement the functions of conductor and switch in a complex way with a high number of pieces and of assembly operations for their construction.

Switch functions not integrated in the mobile arm.

DESCRIPTION OF THE INVENTION

The sun visor disclosed, has been designed to resolve the problem outlined above, providing the added functions of electrical conductor and of double switch, since the constitution of the assembly which the mobile arm and the base plate form, are constituted to determine an integration of functions, the mobile arm containing the functions of rigidity, electrical connection and switches, as well as its own, whilst in the base supporting and fastening the assembly to the bodywork of the vehicle, in addition to the function of joining the hinge to the sun visor with the vehicle, the functions are included of electrical connector and switch.

This arm concept also allows the production in a single manufacturing operation of the actual arm with the connecting conductors and terminals incorporated.

More specifically, the sun visor of the invention is characterised in that the corresponding mobile arm is constituted from two metallic longitudinal rigid elements (for example plates) and conductors, arranged close to but separate from each other by a certain distance which it will be possible to vary over their course through the arm of the sun visor and sized to give rigidity to the aforesaid arm, which elements are coated with a piece of non-conductive insulating material in which they are integrated and which is obtained by means of over-injection on the metallic elements, constituting the body of said arm.

One of the ends of said metallic elements, that which is in correspondence with the side of the L-shaped configuration of the arm which is fitted on the supporting base of the sun visor, is diverted toward the exterior and is finished in ends free of coating, so that on those lengths contact will take place by means of the cables coming from the vehicle.

For its part, the other end of said metallic elements, that which is on the side of the L-shaped arm on which the visor is mounted, in one case is either prolonged in a portion which emerges on the exterior of the actual arm or is diverted toward the external surface of the arm determining an end length which free of coating, whilst the other element is shorter in length and its end is also diverted toward the surface of the arm determining an end length which is free of coating, thereby determining the pertinent electrical contacts to pass current to an electrical device which can be located both on the sun visor and in another part of the vehicle, the connection being established through the terminals which will be incorporated in the actual sun visor for this purpose.

Moreover, the ends of the conductive elements of the mobile arm which remain uncovered on one of the lengths of said arm, are located in an orifice established for this purpose in the base plate where precisely that end of the mobile arm is mounted, and to which orifice the terminals have access that correspond to the power supply, so that the rotation of the mobile arm results in the connection or disconnection of those ends of the conductive elements with respect to the power supply terminals, and therefore the enabling or disabling of the electrical device with which the sun visor itself interacts.

In one form of embodiment the base plate has some parallel and lateral guides to individual expansions corresponding to an orifice or neck in which the end is housed of the segment of the mobile arm which fits on the supporting base of the sun visor, in which guides can be plugged the lateral appendages of a female terminal which is connected to the corresponding conductor strips which fit in the expansions of that hole or neck for housing the end of the smaller segment of the mobile arm, it being precisely those conductor strips which were previously termed power supply terminals.

In another variant of embodiment the base plate has a second type of lateral guides for the coupling and mounting of a socket to protect the actual conductor strips, fitting in the guides of such base plate some lateral projections which that socket has for this purpose.

The sun visor so incorporated provides a solution to the problem expounded in the previous section, contributing a number of benefits among which can be cited, as more important, the following:

Reduction of the number of pieces and assembly operations necessary (simplification of the end product or the sun visor itself and of the manufacturing process thereof).

As a consequence of that said in the previous point, the costs are reduced and the reliability of the production process is enhanced, as well as of the end product or sun visor during its useful life.

It allows easy automation of the production process of the sun visor.

It allows the embodiment of a switch system which is actuated when the sun visor eyeshade is rotated about the axis of rotation of the arm with respect to the base secured to the bodywork, with no need for adding any special piece to the assembly.

It allows the embodiment of a second switch system which is actuated when the visor of the sun visor is rotated about the segment of the arm on which it is mounted.

The manufacturing processes of all the components are very common and straightforward, not requiring a high degree of specialization nor of means, since the production is based on the cold forming of metals (bending, cutting, . . . ) and over-injection of plastic on the metallic inserts which constitute those conductive rigid pieces.

The solution of the sun visor is easily adapted to any type of vehicle and/or of sun visor which has to support any kind of electrical or electronic function.

Versatility of the actual arm of the sun visor, with electrical connection, both the mobile arm and the fastening base being aesthetically compatible with any sun visor of those which incorporate any type of electrical device.

It allows the switch function to act opening or closing the electrical circuit according to the relative positions of the eyeshade and of the arm of the sun visor, both to each other and with respect to the rest of the vehicle.

DESCRIPTION OF THE DRAWINGS

To complete the description which is being made and with the object of assisting in a better understanding of the characteristics of the invention, in accordance with a preferred example of practical embodiment thereof, accompanying as an integral part of said description, is a set of drawings wherein by way of illustration and not restrictively, the following has been represented.

PREFERRED EMBODIMENT OF THE INVENTION

Figure 1:
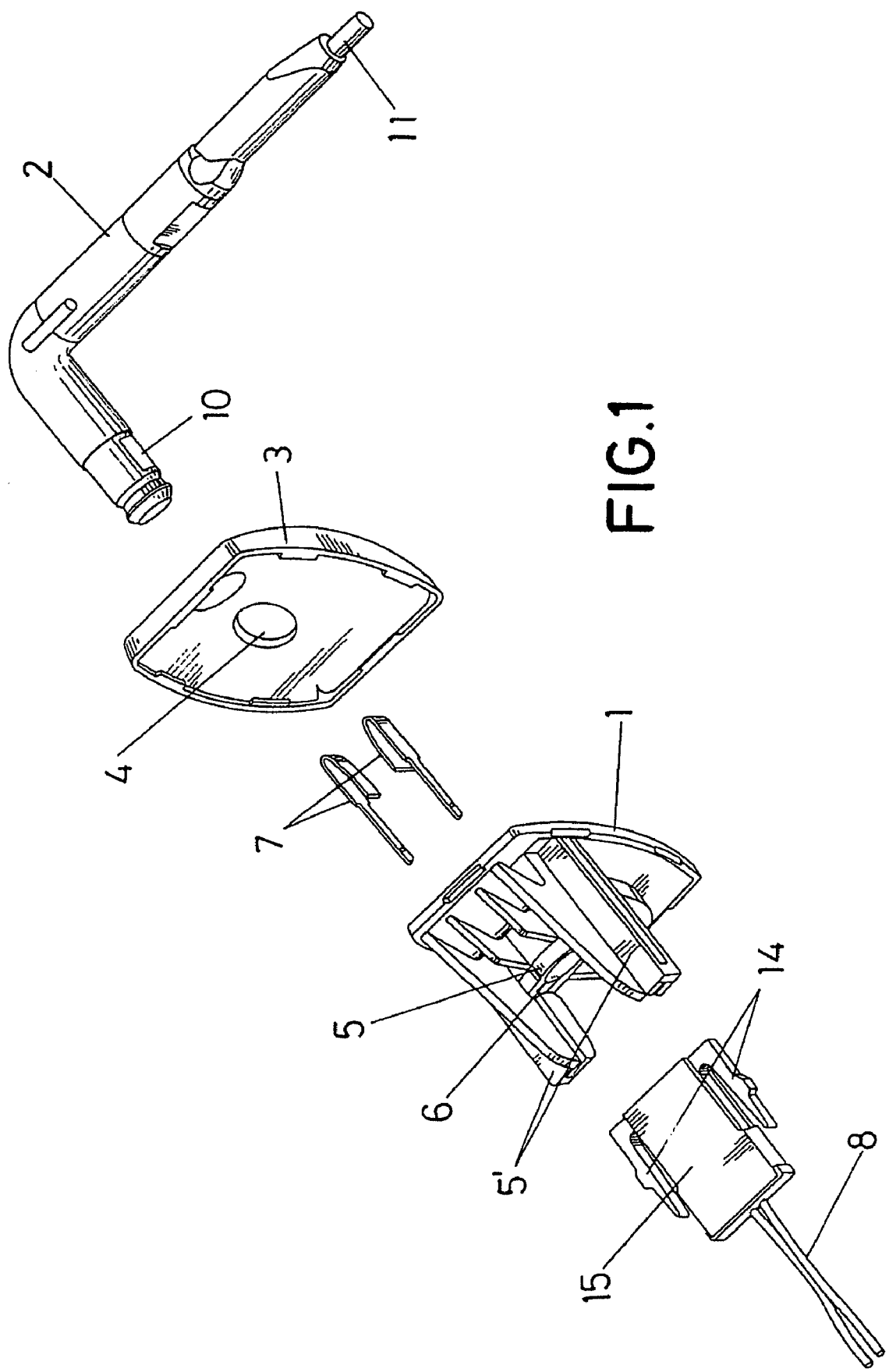
FIG. 1.—It shows a perspective in exploded form of the different components which constitute the base and the arm of the sun visor embodied in accordance with the object of the present invention.
Figure 2:
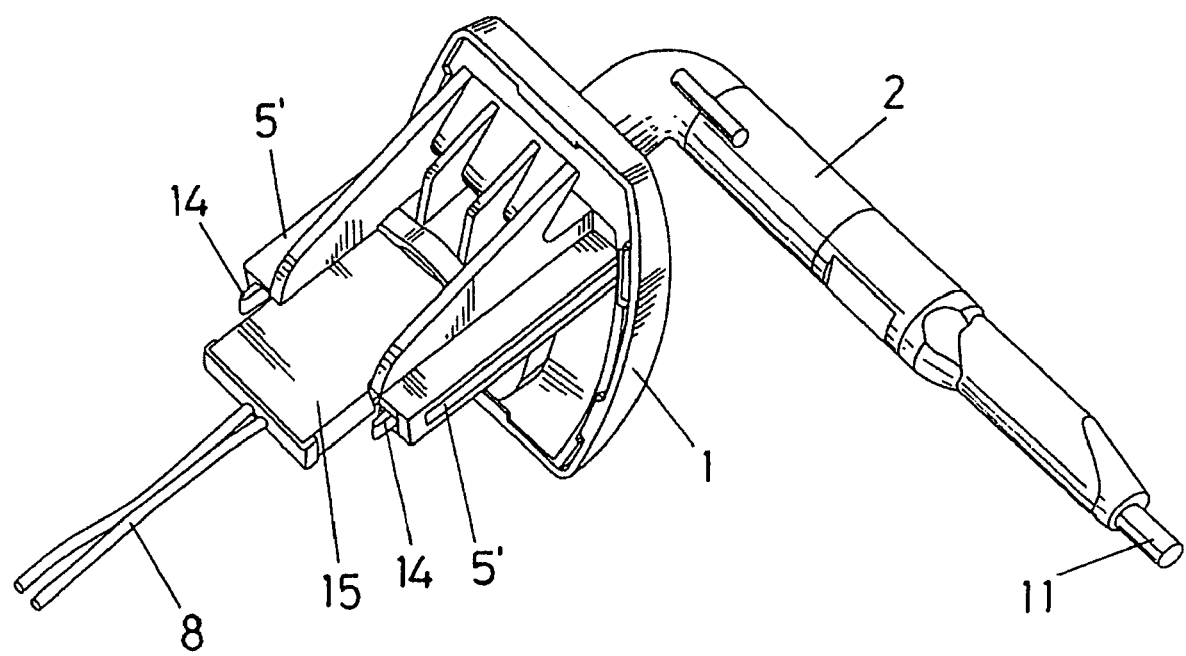
FIG. 2.—It shows a view in perspective of the assembly of base and arm of the sun visor already mounted in accordance with the pieces represented in the previous figure.
Figure 3:
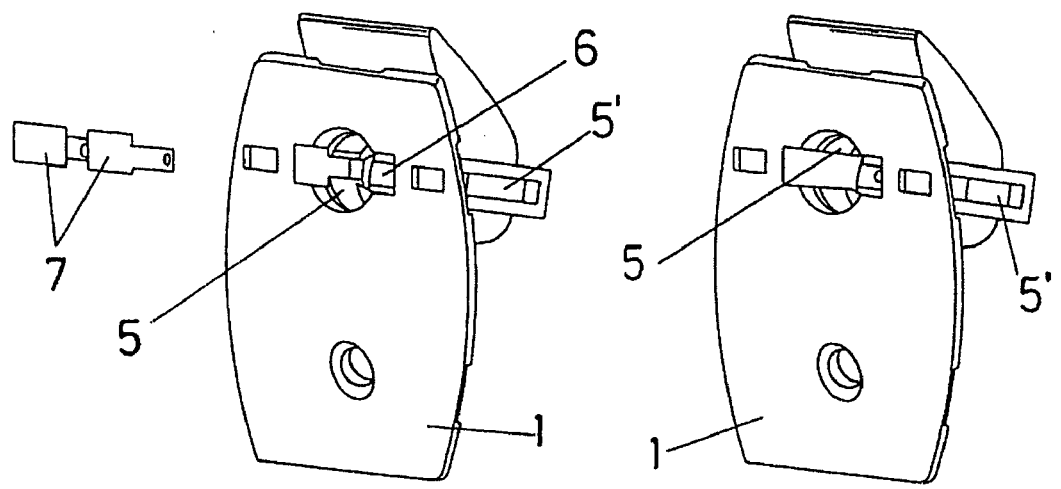
FIG. 3.—It shows different views of the base plate in its first form of embodiment, with its features of the lateral guides and neck or orifice to receive the conductor strips.
Figure 3:
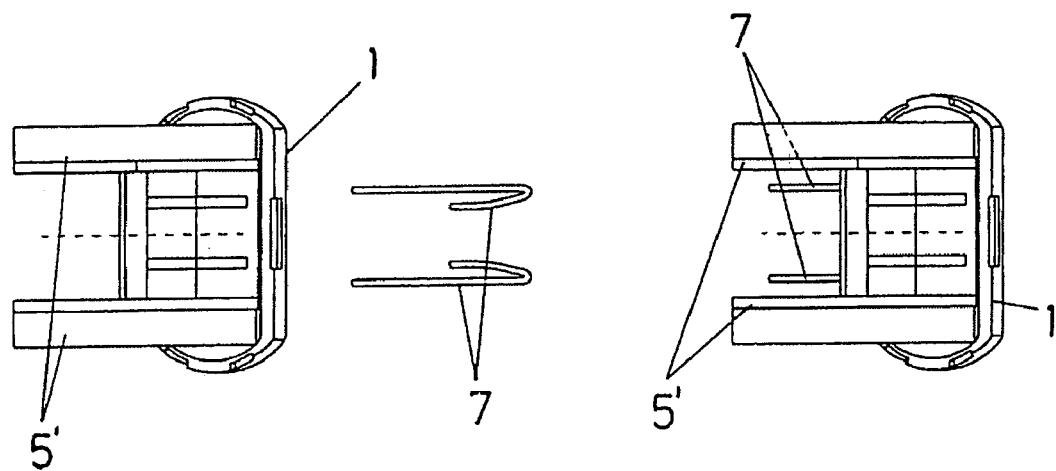
Figure 3:
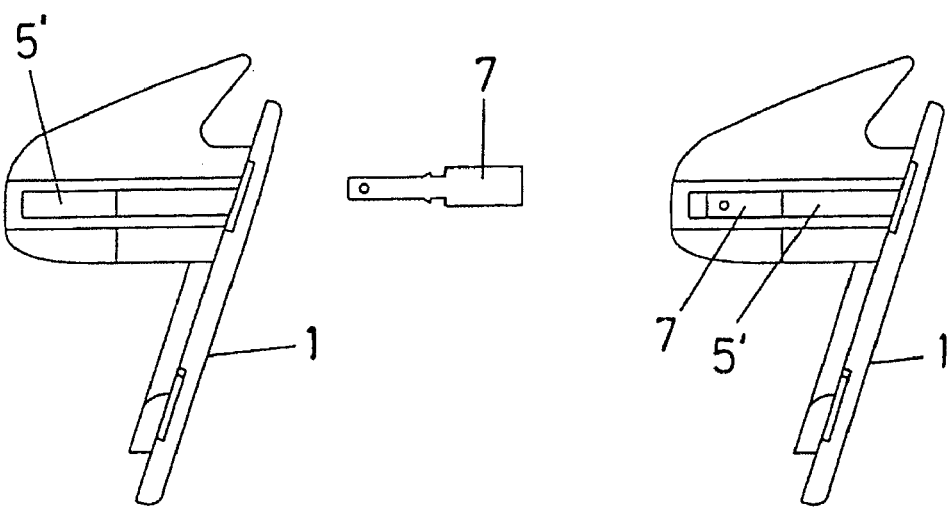

In the light of the foregoing figures, it can be seen how the sun visor of the invention is constituted by means of a base (1) and an arm (2) mounted in a hinged manner with respect to the former, which base (1) can be complemented with a decorative plate (3) which has a hole (4) for the passage of the length of the mobile arm which fits on the base supporting the sun visor (2), since the latter has an L-shape and as is logical has two lengths, so that one of the two lengths of the arm (2), runs through the hole (4) of the decorative plate (3) and is lodged in a hole (5) defining a neck established for this purpose in the securing base (1), since the latter is the piece which by means of screwing, clipping or whatever other appropriate means, is fastened to the vehicle.

The neck or hole (5) of the base (1) has some expansions (6) defining individual housings for the connectors (7) determined by individual conductor strips foreseen in the power supply (8) coming from the vehicle, it being possible to observe how the base plate (1), collaterally with the expansions (6) of the hole or neck (5) has some lateral guides (5') in which can be plugged the lateral appendages (14) of a terminal (15) which is connected on the conductor strips (7) fitting in the expansions (6) of that aforesaid neck or hole (5). Those conductor strips (7) are finished off with one of their ends uncoated and fitted, as has been said, in the expansions (6) with the contacts toward the interior, so that between them is housed the end of the corresponding length of the arm (2), assuring physical contact between the two pieces.

Said arm (2) includes a pair of conductive metallic rigid pieces (9) and (9') of a size to also provide the necessary rigidity to the assembly of the arm (2), those pieces (9) and (9') being inserted in a coating over-injected on the former, to form the actual arm, on which in turn will be mounted the corresponding eyeshade of the sun visor.

The pieces (9) and (9') are mounted separated from each other inside the arm (2), along the same, and both have in correspondence with the end which is on the length of the arm which is coupled to the base of the sun visor (2), a diversion toward the exterior defining individual lengths (10) free of coating, that is to say uncovered, to be able to establish contact with the aforementioned terminals or conductor strips (7) and as will be explained later.

Figure 5A:
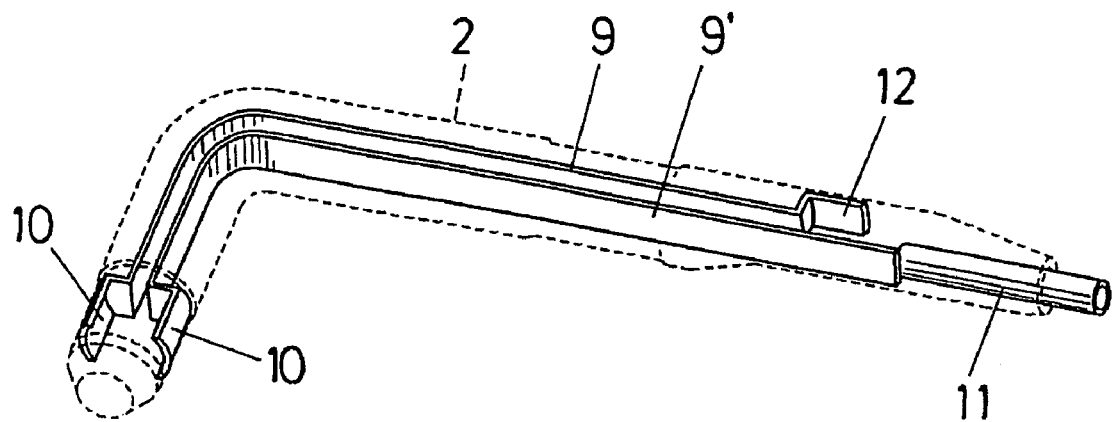
FIGS. 5a, 5b and 5c.—They show some views in perspective of the mobile arm, but showing a section or longitudinal cut of the same to allow the disposition and configuration to be seen of the conductive metallic rigid elements inserted in the enclosure which constitutes the coating of the plastic which forms the body of the actual arm.

The other end of the conductive metallic rigid pieces (9) and (9'), that which is located on the second length of the arm (2), has in one case, specifically in the conductive piece (9'), a prolongation (11) which emerges toward the exterior of the end of the actual arm (2), in correspondence with the length of said arm on which the eyeshade of the sun visor is mounted, whilst the other piece, specifically (9) which is shorter in length, after a diversion toward the exterior, is finished off in an end (12) which is also uncovered so that in combination with the end (11) the corresponding electrical connection terminals are established, as is represented in FIG. 5a.

Figure 4:
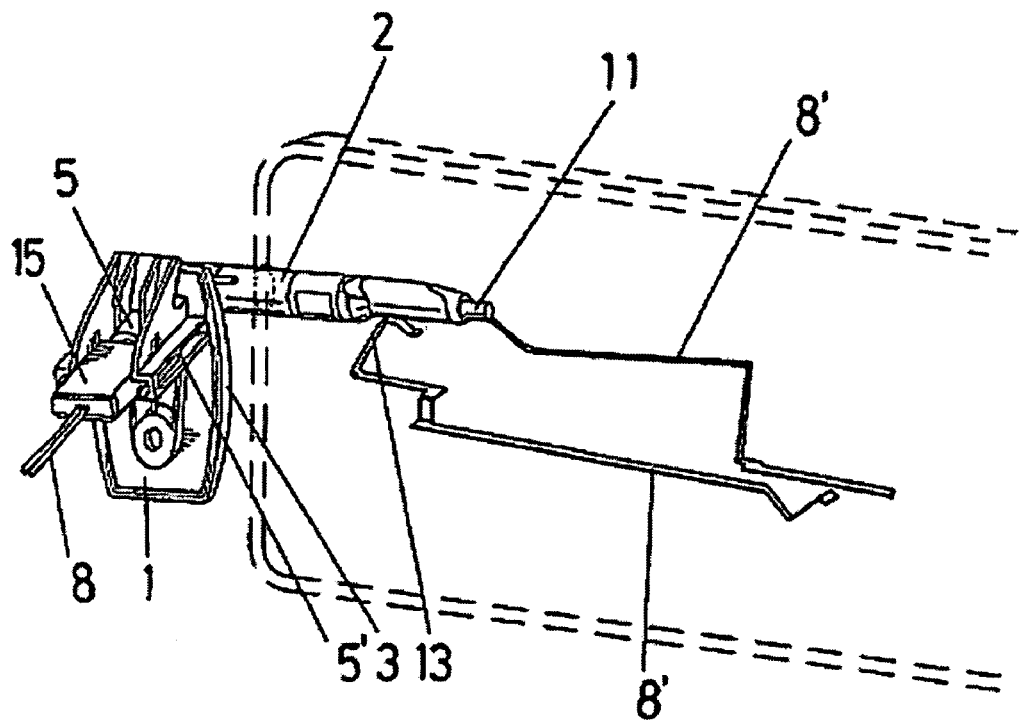
FIG. 4.—It shows two views in perspective, one from the front and the other from behind, corresponding to the form of establishing the connection or disconnection, according to the position of rotation which the eyeshade of the sun visor has.
Figure 4:
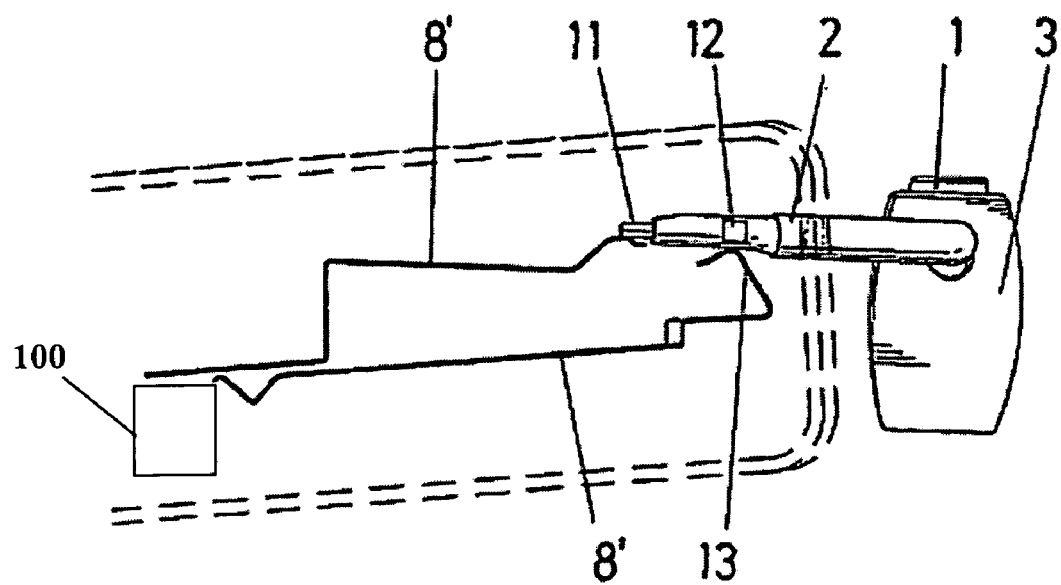

In accordance with the aforesaid, the connection-disconnection of the electrical device, for example electrical device 100 of FIG. 4, interconnected with the movements of the eyeshade or of the mobile arm (2) of the sun visor, can be carried out either by rotating said arm (2), or by rotating the actual eye shade with respect to said arm.

Figure 5B:
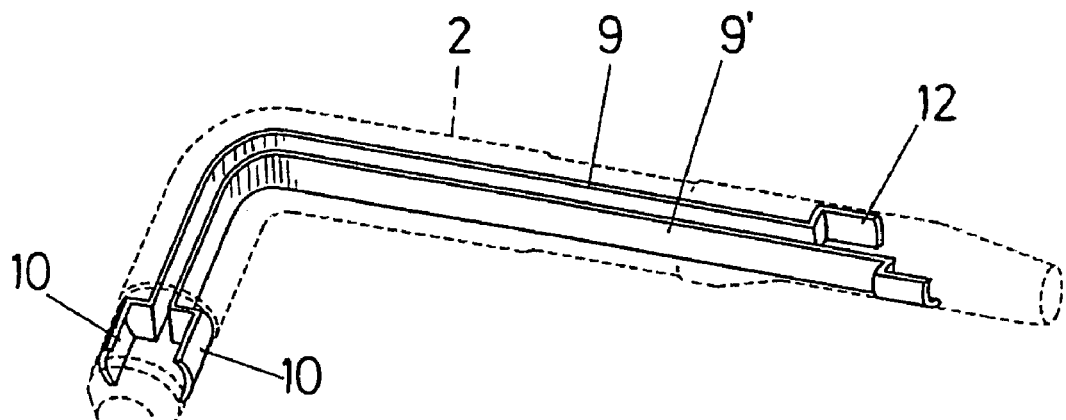

A variant of the arrangement of the terminals of the arm would be that in which both metallic pieces have on their respective ends the same type of diversion toward the exterior, finished off in respective ends whereby they are uncovered in order to establish in combination the corresponding electrical connection terminals, as is represented in FIG. 5b.

Figure 5C:
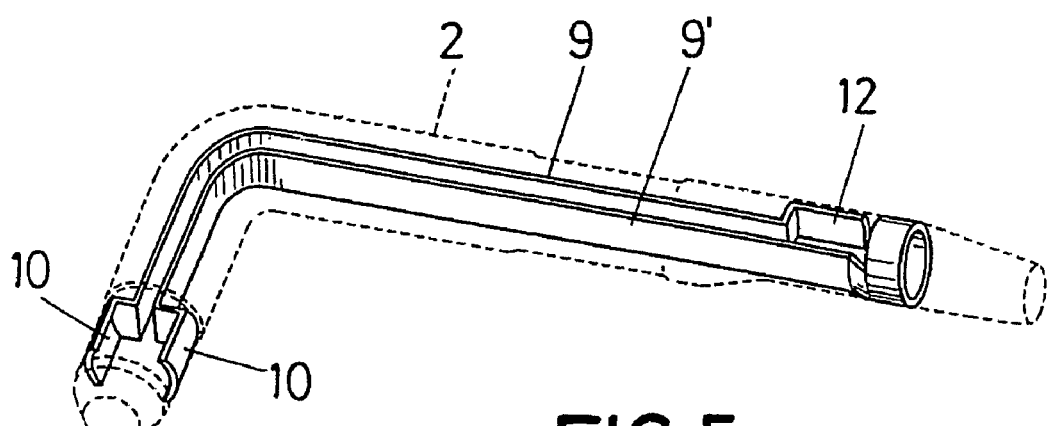

Another variant of the arrangement of the terminals of the arm would be that in which one of the two ends corresponding to individual conductive pieces form a continuous peripheral ring as area of electrical contact, the other one being that which performs the switch function, as is represented in FIG. 5c.

When the arm (2) is rotated about the axis of rotation with respect to the base of the sun visor, the strips (7) corresponding to the power supply (8) proceeding from the vehicle, in which they are statically located in the housings defined by the expansions (6) of the hole or neck (5) of the base (1), can remain in contact with the ends (10) of the conductive pieces (9) and (9') or in points intermediate or intercalated with those ends (10), in accordance with the position in the rotation of the arm (2), so that in the first case the electrical connection will be established and in the second said electrical connection will be interrupted, and thereby the enabling or disabling, respectively, of the electrical device interconnected with the movements of the arm (2) of the sun visor. The disconnection position corresponds to the idle position, that is, when the arm (2) occupies its inoperative position, whilst when it is rotated into the operative position is when the connection is established.

Thus, if the eyeshade of the sun visor is rotated with respect to the mobile arm (2), which rotation will be made with respect to an axis parallel to that of the corresponding length of the arm of the sun visor, it will be possible to establish the corresponding connection or disconnection, since the power supply conductors (8') in this case, are, one of them connected permanently to the terminal (11) of the conductive rigid metallic piece (9'), while the other one carries a contact (13) which in the rotation of the eyeshade, as it is mounted on the latter, can make contact with the end (12) of the conductive rigid metallic piece (9) and establish the corresponding electrical connection, or remain offset with respect to that end (12) and therefore establish the disconnection.

Figure 6:
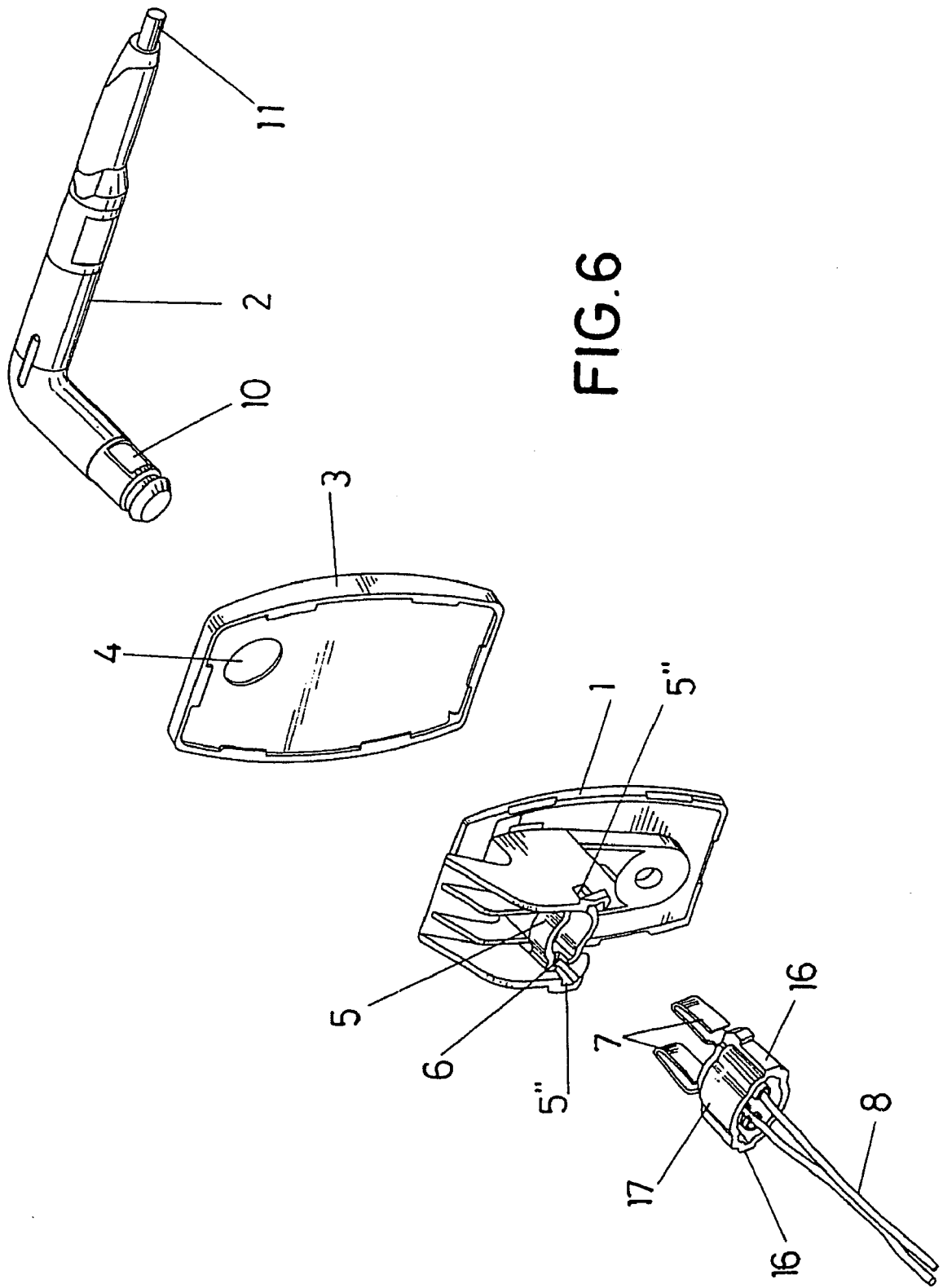
FIG. 6.—It shows a view according to a perspective in exploded form of the assembly of elements which comprise a second variant of the hinged assembly formed by the base and the arm of the sun visor object of the invention.
Figure 7:
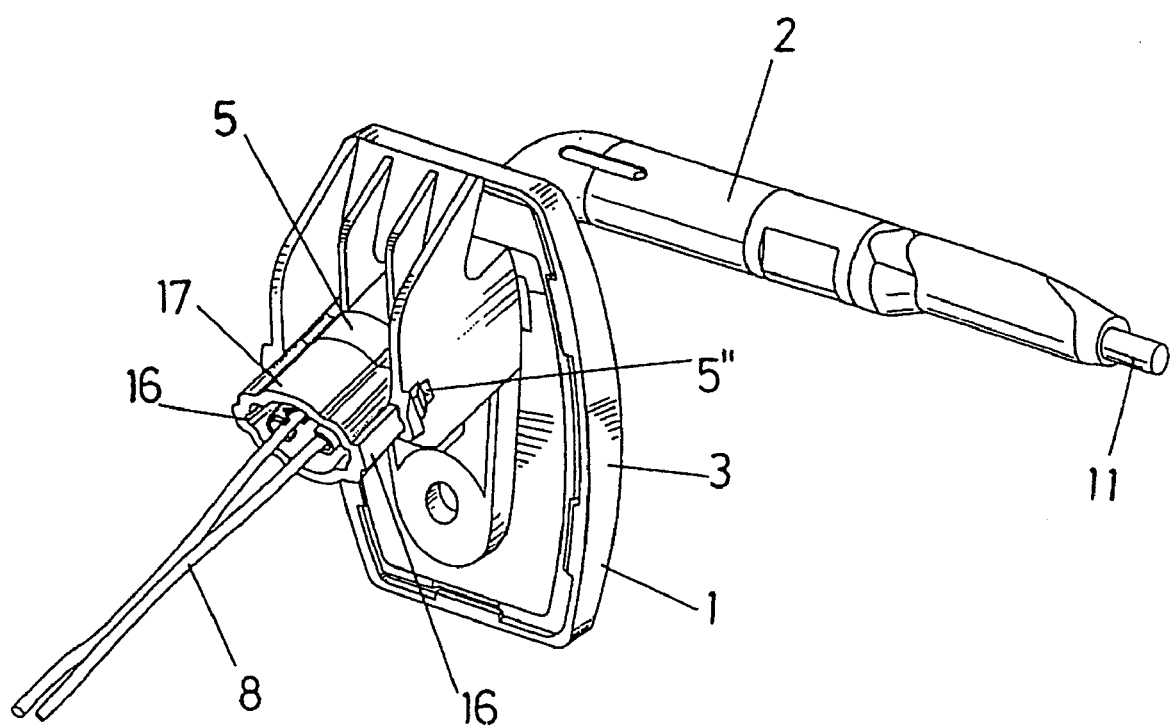
FIG. 7.—It shows, finally, a view in perspective of the coupling of the elements which constitute the base and arm assembly of the sun visor already mounted in accordance with said second form of embodiment.

In a second variant of embodiment of the base of the sun visor shown in FIGS. 6 and 7, on the base plate (1) some lateral guides (5") are formed on which lateral projections (16) are located and slide corresponding to a protective socket (17) with the conductor strips (7) which are positioned in the expansions (6) of the cylindrical neck or hole (5) of the base (1), those conductor strips (7) being joined to the power supply conductors (8), as terminal posts of these and fit in the expansions (6) through the outwardly diverted ends of such strips (7), between which will be located the end of the length of the mobile arm (2) which is mounted on the base supporting the same.

The invention claimed is:

1. Sun visor with conductive arm for vehicles constituted by means of two pieces hinged to each other, one as a base for fastening to the vehicle, and another a mobile arm mounted in a hinged manner with respect to said base, and on said mobile arm, which is arranged in the form of two lengths rigidly joined to each other, is mounted a corresponding eyeshade capable of acting on a device fed electrically through connectors or terminals coming from the vehicle, is characterized in that the base has a hole or neck and housings for conductor strips associated with power supply cables coming from the vehicle, in said hole or neck is mounted a corresponding end of said mobile arm of the sun visor; with said mobile arm constituted from two conductive metallic rigid pieces arranged lengthwise along said mobile arm and with a certain separation between them, with an insulating coating over-injected on the mobile arm, one end of each of said conductive metallic rigid pieces having a diversion positioned in correspondence with a first length of the mobile arm which is coupled on the base of the sun visor, said end of each of said conductive metallic rigid pieces is uncoated in order to be able to establish contact with the conductor strips, in accordance with a position in rotation of the mobile arm about a corresponding axis of rotation with respect to the aforementioned base for fastening the sun visor, whilst a second end of a first conductive metallic rigid piece is in correspondence with a second length of the arm, on which is mounted the eyeshade of the sun visor, with the second end of the first conductive metallic rigid piece prolonged in a length which emerges on the exterior of the mobile arm, whilst a second conductive metallic rigid piece of shorter length and its second end, after a diversion, remains uncovered on said segment of the mobile arm, corresponding to the sun visor eyeshade, to be able to establish connection with a contact foreseen in the eyeshade, when the eyeshade is rotated about the arm, in order to establish supply to the device fed electrically which the vehicle incorporates, be this incorporated or not in the eyeshade of the sun visor.

2. Sun visor with conductive arm for vehicles, according to claim 1, characterized in that the base of the sun visor has, in the hole or neck, individual lateral expansions of said neck or hole for housing the corresponding end of the mobile arm.

3. Sun visor with conductive arm for vehicles, according to claim 1, characterized in that collaterally with said lateral expansions, a pair of lateral guides has been foreseen for sliding contact with appendages belonging to a terminal to which are fastened the power supply cables coming from the vehicle.

4. Sun visor with conductive arm for vehicles, according to claim 2, characterized in that collaterally with the lateral expansions of the neck or hole for housing the corresponding end of the mobile arm, individual lateral guides have been foreseen for holding and sliding respective lateral projections belonging to a protective socket of the conductor strips joined to the power supply cables.

5. Sun visor with conductive arm for vehicles, according to claim 1, characterized in that two terminals of the conductive metallic rigid pieces of the mobile arm of the sun visor corresponding to the length of the mobile arm on which the eyeshade is mounted are both constituted in the same way, both being uncovered on the length of the mobile arm corresponding to the eyeshade of the sun visor after the diversion, to be able to establish connection with a contact foreseen in the eyeshade, when the eyeshade rotates with respect to the mobile arm, in order to establish the supply to the device fed electrically.

6. Sun visor with conductive arm for vehicles, according to claim 2, characterized in that collaterally with said lateral expansions, a pair of lateral guides has been foreseen for sliding contact appendages belonging to a terminal to which are fastened the power supply cables coming from the vehicle.

7. Sun visor with conductive arm for vehicles, according to claim 2, characterized in that collaterally with the lateral expansions of the neck or hole for housing the corresponding end of the mobile arm, individual lateral guides have been foreseen for holding and sliding respective lateral projections belonging to a protective socket of the conductor strips joined to the power supply cables.

* * * * *